(12) United States Patent
Kim et al.

(10) Patent No.: US 11,190,963 B2
(45) Date of Patent: Nov. 30, 2021

(54) SIGNAL TRANSMISSION METHOD FOR V2X COMMUNICATION IN WIRELESS COMMUNICATION SYSTEM AND APPARATUS THEREFOR

(71) Applicant: LG ELECTRONICS INC., Seoul (KR)

(72) Inventors: Youngtae Kim, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 16/560,519

(22) Filed: Sep. 4, 2019

(65) Prior Publication Data

US 2019/0394665 A1    Dec. 26, 2019

Related U.S. Application Data

(63) Continuation of application No. 15/742,205, filed as application No. PCT/KR2016/007518 on Jul. 11, 2016, now Pat. No. 10,616,786.

(Continued)

(51) Int. Cl.
*H04W 24/10* (2009.01)
*H04W 4/40* (2018.01)
(Continued)

(52) U.S. Cl.
CPC .............. *H04W 24/10* (2013.01); *H04W 4/40* (2018.02); *H04W 72/085* (2013.01);
(Continued)

(58) Field of Classification Search
CPC ......... G06F 1/1626; H04B 1/38; H04B 1/406; H04B 7/15; H04L 43/06; H04M 1/00; H04W 4/40; H04W 4/42–48; H04W 8/005; H04W 8/26; H04W 16/26; H04W 24/02; H04W 24/10; H04W 36/00;
(Continued)

(56) References Cited

U.S. PATENT DOCUMENTS 8,488,714 B2    7/2013  Wu et al.
9,572,186 B2 *  2/2017  Yang ..................... H04W 76/14
(Continued)

FOREIGN PATENT DOCUMENTS

KR    1020100059633 A    6/2010
KR    1020150004018 A    1/2015
WO       2014185747 A1   11/2014

*Primary Examiner* — Thomas R Cairns
(74) *Attorney, Agent, or Firm* — Dentons US LLP

(57) ABSTRACT

The present invention relates to a signal transmission method and apparatus of a user equipment for vehicle to everything (V2X) communication in a wireless communication system. Specifically, the method comprises the steps of: feeding back measurement information related to a dedicated carrier configured to be used for the V2X communication, to a serving cell through a serving carrier; receiving, from the serving cell, a control message including carrier selection information transmitted from a network node controlling the dedicated carrier; and transmitting a V2X signal through at least one of the dedicated carrier or the serving carrier according to the carrier selection information.

10 Claims, 10 Drawing Sheets

Related U.S. Application Data

(60) Provisional application No. 62/190,758, filed on Jul. 10, 2015, provisional application No. 62/191,534, filed on Jul. 13, 2015, provisional application No. 62/206,243, filed on Aug. 17, 2015.

(51) Int. Cl.
*H04W 72/08* (2009.01)
*H04W 74/08* (2009.01)
*H04W 84/00* (2009.01)
*H04W 88/02* (2009.01)

(52) U.S. Cl.
CPC ...... *H04W 74/0808* (2013.01); *H04W 84/005* (2013.01); *H04W 88/02* (2013.01)

(58) Field of Classification Search
CPC ......... H04W 36/0083; H04W 36/0088; H04W 40/24; H04W 52/02; H04W 52/365; H04W 72/08; H04W 72/085; H04W 74/02; H04W 74/0808; H04W 74/0816–0825; H04W 76/28; H04W 84/005; H04W 84/047; H04W 88/02; H04W 88/021–06

See application file for complete search history.

(56) References Cited

U.S. PATENT DOCUMENTS

| | | | |
|---|---|---|---|
| 10,091,299 B2 * | 10/2018 | Mian | H04W 4/42 |
| 10,278,107 B2 | 4/2019 | Kazmi et al. | |
| 2010/0232296 A1 | 9/2010 | Michimoto et al. | |
| 2014/0094183 A1 | 4/2014 | Gao et al. | |
| 2016/0066237 A1 * | 3/2016 | Kato | H04W 24/10 |
| | | | 370/331 |
| 2016/0286579 A1 * | 9/2016 | Park | H04L 5/0048 |
| 2017/0171837 A1 * | 6/2017 | Chen | H04W 72/04 |
| 2017/0294981 A1 | 10/2017 | Kim et al. | |
| 2018/0139781 A1 * | 5/2018 | Park | H04W 74/0808 |
| 2018/0234973 A1 * | 8/2018 | Lee | H04W 24/08 |
| 2018/0376485 A1 * | 12/2018 | Kahtava | H04W 4/44 |
| 2021/0022139 A1 * | 1/2021 | Shin | H04W 24/08 |

* cited by examiner (a) Control plane protocol stack (b) User plane protocol stack

SIGNAL TRANSMISSION METHOD FOR V2X COMMUNICATION IN WIRELESS COMMUNICATION SYSTEM AND APPARATUS THEREFOR

This application is a continuation of U.S. patent application Ser. No. 15/742,205 filed Jan. 5, 2018, which is a 35 USC § 371 National Stage entry of International Application No. PCT/KR2016/007518 filed on Jul. 11, 2016, and claims priority to U.S. Provisional Application Nos. 62/190,758 filed on Jul. 10, 2015; 62/191,534 filed on Jul. 13, 2015 and 62/206,243 filed on Aug. 17, 2015, all of which are hereby incorporated by reference in their entireties as if fully set forth herein.

TECHNICAL FIELD

The present invention relates to a wireless communication system, and more particularly, to a method of transmitting a signal for performing V2X communication in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

Based on the aforementioned discussion, the present invention intends to propose a method of transmitting a signal for V2X communication in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a signal, which is transmitted by a user equipment to perform V2X (vehicle to everything) communication in a wireless communication system, includes the steps of feeding back measurement information on a dedicated carrier configured to be used for the V2X communication to a serving cell via a serving carrier, receiving a control message including carrier selection information transmitted from a network node controlling the dedicated carrier from the serving cell, and transmitting a V2X signal via at least one of the dedicated carrier and the serving carrier according to the carrier selection information.

Preferably, the dedicated carrier may correspond to a carrier capable of allocating a signal for the V2X communication allocated by a plurality of cells including the serving cell.

Preferably, the measurement information can include at least one selected from the group consisting of traffic load of the dedicated carrier, location information of the user equipment, and V2X signal transmission information.

Preferably, the control message can further include at least one selected from the group consisting of a carrier sensing threshold, a backoff window, transmit power control, a message generation rate, and a channel access probability.

Preferably, the carrier selection information can indicate a use probability of the dedicated carrier and a use probability of the serving carrier, respectively.

Preferably, the carrier selection information can include at least one selected from the group consisting of power information, modulation order information, repetition number information, and a resource block size and a carrier to be used for the V2X communication can be determined according to the carrier selection information.

Preferably, if it fails to receive the control message, the method can further include the step of performing carrier sensing according to a parameter set to the user equipment in advance.

To further achieve these and other advantages and in accordance with the purpose of the present invention, according to a different embodiment, a method of receiving a signal, which is received by a user equipment to perform V2X (vehicle to everything) communication in a wireless communication system, includes the steps of feeding back measurement information on a specific carrier configured to be used for V2X event transmission to a serving cell via a serving carrier, receiving a control message including carrier selection information transmitted from a network node controlling the specific carrier from the serving cell, and determining at least one of the specific carrier and the serving carrier as a reception carrier for the V2X event transmission according to the carrier selection information. In this case, the specific carrier may correspond to a carrier mapped according to an area at which the user equipment is located.

To further achieve these and other advantages and in accordance with the purpose of the present invention, according to a further different embodiment, a user equipment transmitting a signal to perform V2X (vehicle to everything) communication in a wireless communication system includes a radio frequency unit and a processor, the processor configured to feedback measurement information on a dedicated carrier configured to be used for the V2X communication to a serving cell via a serving carrier, the processor configured to receive a control message including carrier selection information transmitted from a network node controlling the dedicated carrier from the serving cell, the processor configured to transmit a V2X signal via at least one of the dedicated carrier and the serving carrier according to the carrier selection information.

To further achieve these and other advantages and in accordance with the purpose of the present invention, according to a further different embodiment, a user equipment receiving a signal to perform V2X (vehicle to everything) communication in a wireless communication system includes a radio frequency unit and a processor, the processor configured to feedback measurement information on a specific carrier configured to be used for V2X event transmission to a serving cell via a serving carrier, the processor configured to receive a control message including carrier selection information transmitted from a network node controlling the specific carrier from the serving cell, the processor configured to determine at least one of the specific carrier and the serving carrier as a reception carrier for the V2X event transmission according to the carrier selection information. In this case, the specific carrier may correspond to a carrier mapped according to an area at which the user equipment is located.

Advantageous Effects

According to embodiments of the present invention, it is able to efficiently transmit a signal for V2X communication in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
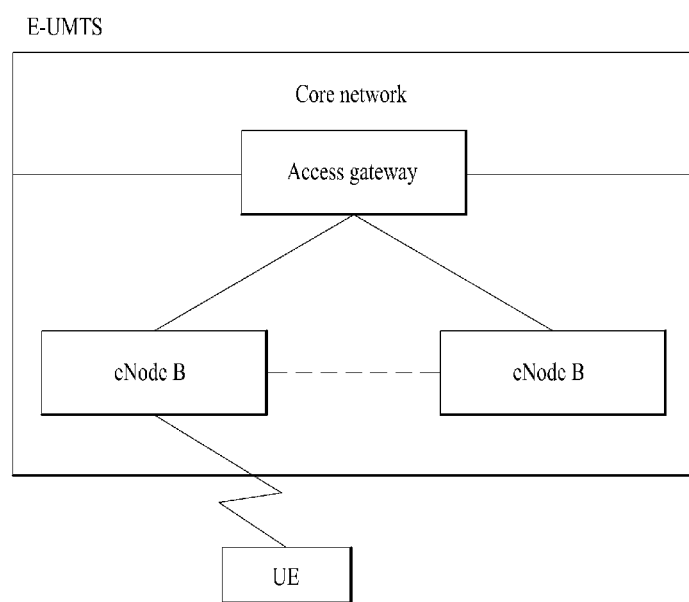
FIG. 1 is a schematic diagram of E-UMTS network structure as one example of a wireless communication system.
Figure 2:
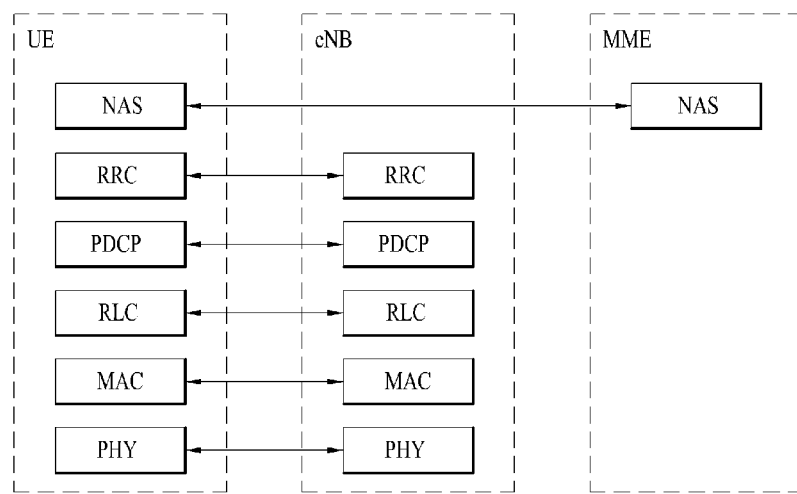
FIG. 2 is a diagram illustrating structures of a control plane and a user plane of a radio interface protocol between a user equipment and E-UTRAN based on the 3GPP radio access network standard.
Figure 2:
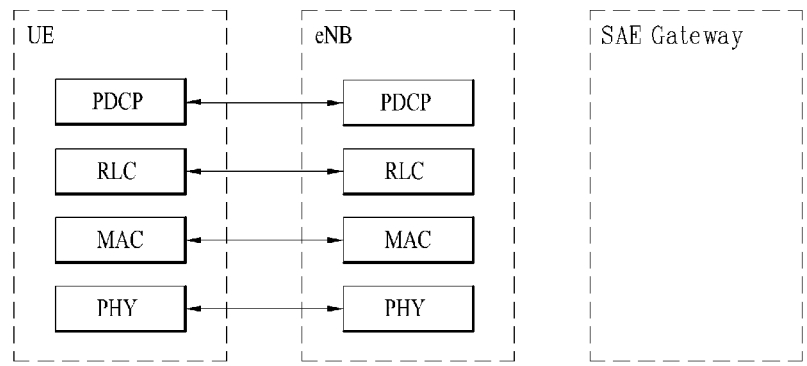

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
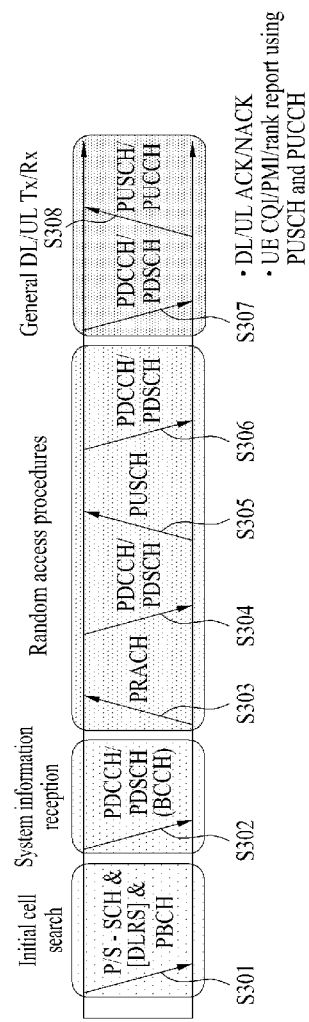
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
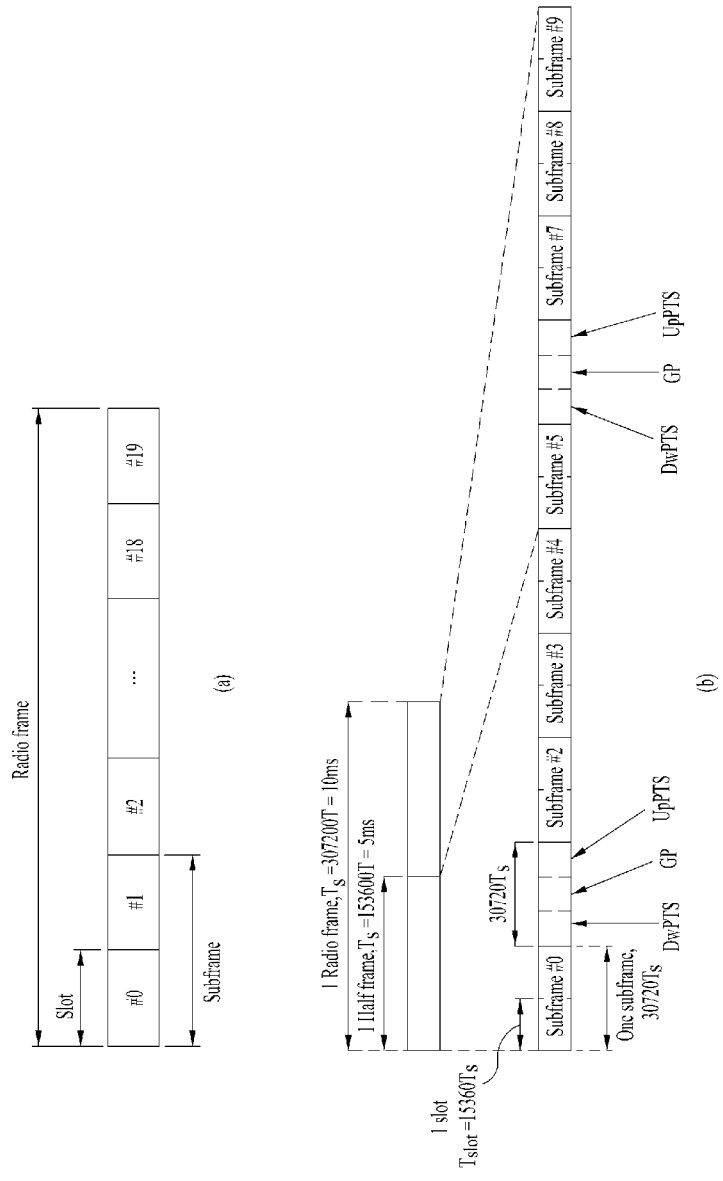
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
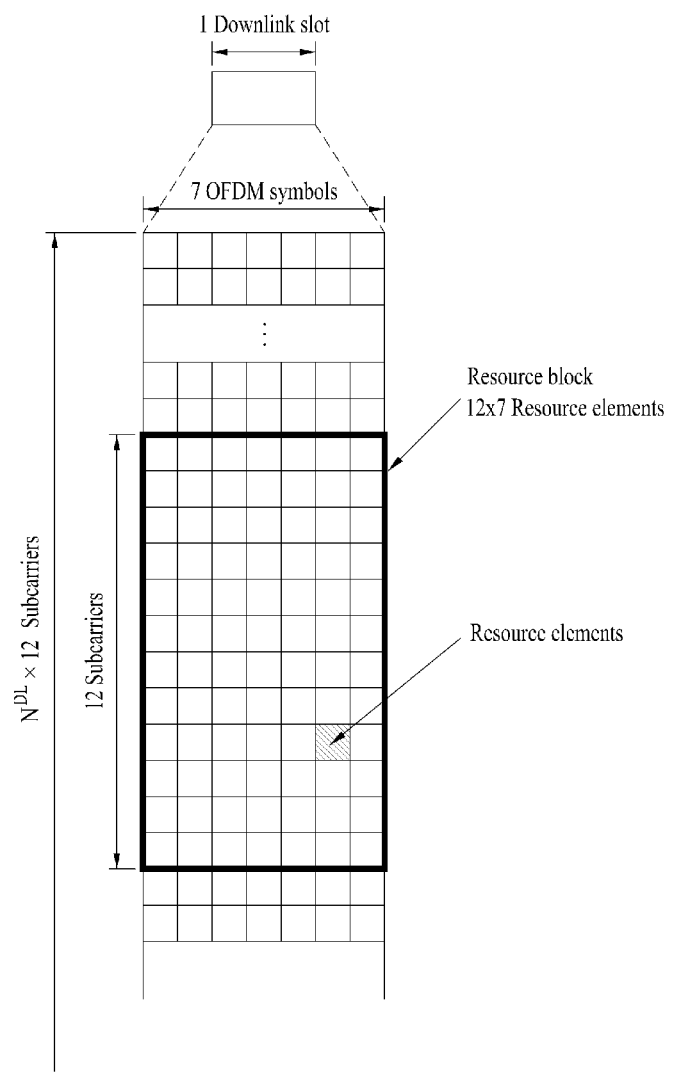
FIG. 5 is a diagram for an example of a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{SC}^{RB}$ subcarriers, the DL slot includes $N_{RB}^{DL} \times N_{SC}^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{SC}^{SC}$ resource elements. The number ($N_{RB}^{DL}$) of resource blocks included in the DL slot depends on a DL transmission bandwidth configured in a cell.

Figure 6:
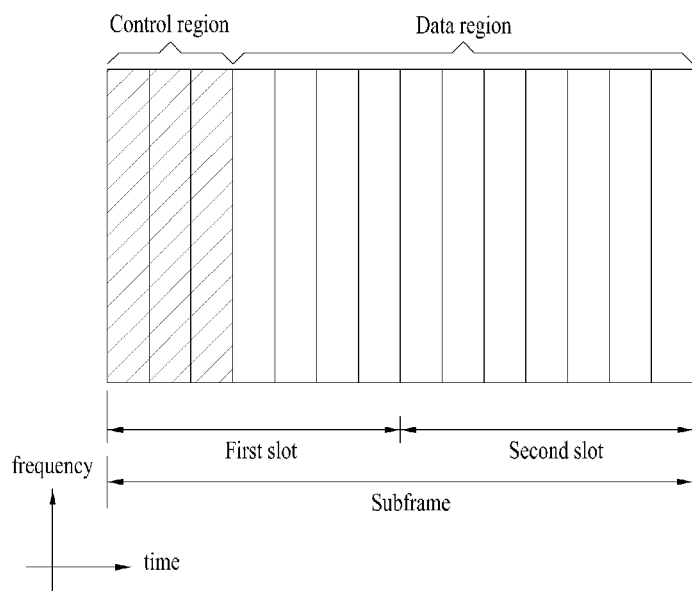
FIG. 6 is a diagram illustrating a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
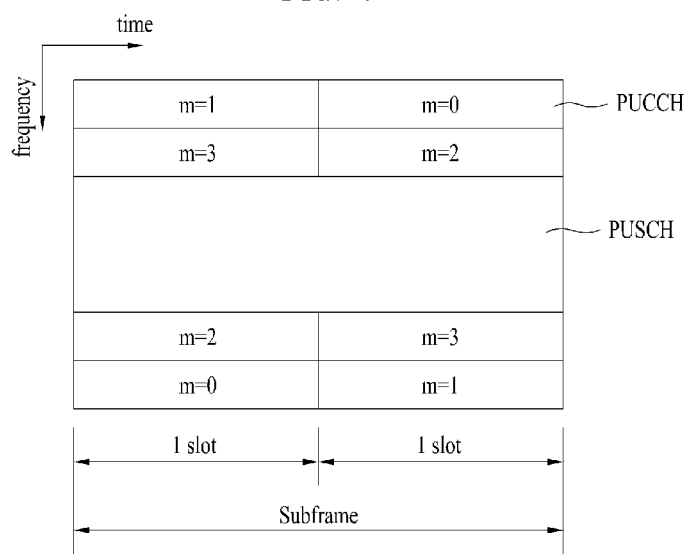
FIG. 7 is a diagram illustrating a structure of an uplink subframe used in an LTE system.

FIG. 7 is a diagram illustrating a structure of an uplink subframe used in an LTE system.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

In the following description, a D2D (UE-to-UE communication) communication is explained.

A D2D communication scheme is mainly divided into a scheme of receiving help from a network/coordination station (e.g., a base station) and a scheme not receiving help from the network/coordination station.

Figure 8:
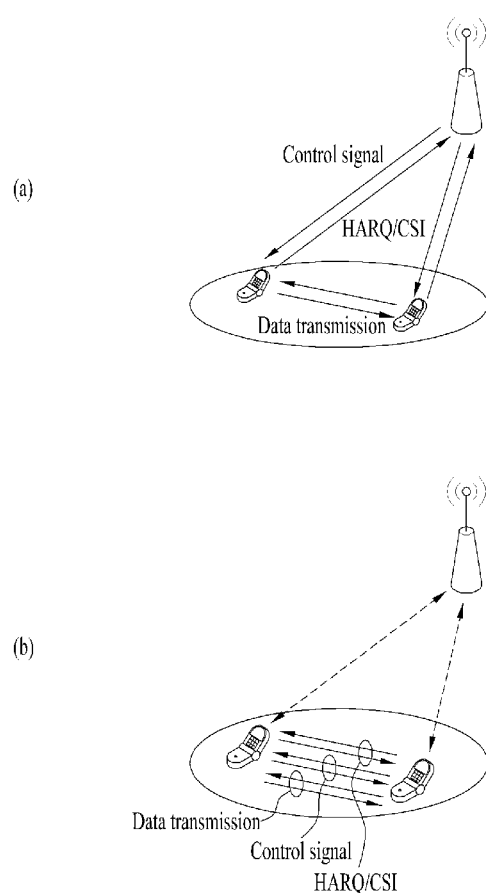
FIG. 8 is a diagram for explaining D2D (UE-to-UE communication) communication.

Referring to FIG. 8, FIG. 8 (a) shows a scheme that the network/coordination station involves in transmitting and receiving a control signal (e.g., a grant message), HARQ, channel state information, and the like and data is transmitted and received only between UEs performing D2D communication. FIG. 8 (b) shows a scheme that the network provides minimum information (e.g., D2D connection information capable of being used in a corresponding cell, etc.) to UEs and the UEs performing D2D communication form a link and perform data transmission and reception.

Figure 9:
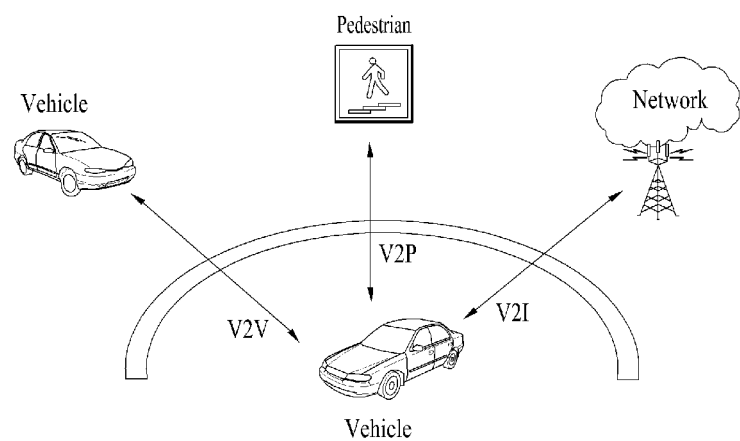
FIG. 9 is a diagram for explaining a V2X scenario.

FIG. 9 is a diagram illustrating V2X (vehicle to everything) communication environment.

If a car accident occurs, damage of human life and damage of property occur. Hence, when a vehicle operates, a technology capable of securing not only the safety of a person on the vehicle but also the safety of a pedestrian is increasingly required. As a result, a hardware and software based technology specialized to a vehicle is now incorporated into a vehicle.

An LTE-based V2X (vehicle-to-everything) communication technology started from 3GPP also reflects the tendency that an IT (information technology) is incorporated into a vehicle. A connectivity function is mainly applied to a certain type of vehicle and ongoing effort to support V2V (vehicle-to-vehicle) communication, V2I (vehicle-to-infrastructure) communication, V2P (vehicle-to-pedestrian) communication, and V2N (vehicle-to-network) is in progress via the evolution of the connectivity function.

According to the V2X communication, a vehicle consistently broadcasts information on a location, a speed, a direction, and the like of the vehicle. Having received the broadcasted information, an adjacent vehicle recognizes movement of vehicles near the adjacent vehicle and utilizes the movements to prevent an accident.

Similar to a case that a person possesses a terminal having a shape of a smartphone or a smart watch, a terminal (or, a UE (user equipment)) of a specific shape is installed in each vehicle. In this case, the UE installed in a vehicle corresponds to a device receiving an actual communication service from a network. For example, the UE installed in the vehicle can receive a communication service in a manner of accessing an eNB in E-UTRAN.

Yet, in order to implement V2X communication in a vehicle, it is necessary to consider various items. This is because an astronomical amount of money is required to install a traffic safety infrastructure such as a V2X eNB, and the like. In particular, in order to support the V2X communication to all of the roads on which a vehicle is movable, it is necessary to install hundreds of thousands of V2X eNBs. Moreover, since each network node basically uses a wired network to stably perform communication with a server and accesses the internet or a central control server using the wired network, installation/maintenance cost for the wired network is also high.

Moreover, according to the present invention, it may use a dedicated carrier to perform V2X communication in V2X environment. Specifically, when a dedicated carrier is used for V2X, the present invention relates to a method of controlling the dedicated carrier when the dedicated carrier is positioned at the outside of the coverage of an eNB. Although the present invention is explained centering on V2X, the present invention can also be applied to D2D and other scenarios.

In the present invention, if a dedicated carrier is positioned at the outside of the coverage of an eNB, it indicates that an eNB capable of controlling the dedicated carrier does not exist. In this case, the eNB may correspond to an RSU (road side unit) in the V2X communication.

When V2X communication is performed via a plurality of dedicated carriers, if it is unable to perform appropriate control, a collision may occur between V2X communications different from each other that use the dedicated carriers. As a result, inefficient management may occur. Hence, in order to efficiently perform the V2X communications different from each other, it is necessary to apply appropriate control to the dedicated carriers.

Moreover, a plurality of communication service providers may use a dedicated carrier at the same time. If a dedicated carrier is positioned at a band of a form not assigned to a single service provider (e.g., an unlicensed band or a band at which UEs subscribed to a plurality of service providers coexist), a case of using the dedicated carrier at the same time may occur more frequently.

For clarity, the present invention is described centering on a carrier. Yet, in the present invention, a carrier can also be interpreted/applied as a radio resource represented by a set of specific time and/or specific frequencies.

In the present invention, when a carrier for performing V2X communication is located at the outside of coverage (out of coverage) of an eNB, assume that there is a controller in charge of the control of the carrier. Moreover, if a plurality of carriers are located at the outside of the coverage, a controller may exist according to each of a plurality of the carriers or a controller may control two or more carriers. And, the controller may correspond to a device belonging to a network of an individual service provider. Or, if a plurality of service providers use a dedicated carrier together, the controller may correspond to a device configured to control a UE operation of each of a plurality of the service providers while being located at the outside of a network of an individual service provider. In the latter case, in order to control UEs of all service providers, the controller can configure an interface with an individual service provider network.

Moreover, for clarity, assume that a carrier B (e.g., B1, B2, ...) corresponds to a carrier belonging to the coverage of an eNB (i.e., in-coverage carrier). In this case, service providers using each of the carriers B1, B2, ... may be different from each other. And, assume that a carrier C (e.g., C1, C2, ...) corresponds to a carrier incapable of receiving control of an eNB because the carrier C is not located within the coverage of the eNB (i.e., out-of-coverage carrier). And, assume that the carrier C corresponds to a dedicated carrier for V2X communication. In this case, the carrier C assumes that there is the aforementioned external controller for controlling the carrier C.

In this case, UEs (e.g., a vehicle or a pedestrian) of V2X can report a status of the carrier C measured at the carrier C to an eNB corresponding to a serving eNB of the UEs using the carrier B. In this case, the status of the carrier C may correspond to an overall status such as traffic load of the carrier C or a status of arranging the UEs. Or, the status of the carrier C may correspond to a status that transmission is performed or a status that transmission is to be performed. Each of serving eNBs can feedback the status information to a controller of the carrier C using a backhaul link.

When an eNB receives the feedback from a UE via the carrier B, if the eNB forwards a feedback message to a controller as it is, it may cause excessive signaling overhead. In particular, if UEs positioned at a similar position feedback almost the same information such as load information, the signaling overhead may increase. Hence, the eNB may forward the feedback message to the controller by appropriately integrating the feedback messages of a plurality of UEs in accordance with a predetermined format. For example, the eNB may calculate an average of traffic load fed back by UEs at a prescribed region (e.g., a prescribed region to which longitude and latitude belong) during a prescribed time section and forward the calculated average to the controller.

At least one of more UEs can report a traffic load status of the carrier C to a serving eNB using the carrier B by performing carrier sensing on the carrier C. If each of UEs reports location information such as GPS information to the serving eNB using the carrier B, it is able to know an arrangement status of the UEs. The UEs may feedback information indicating that the UEs currently perform transmission or information indicating that the UEs intend to perform transmission to the serving eNB using the carrier B for a transmission status.

Moreover, information necessary to be identified by the serving eNB or information necessary to be reported to the controller can include location information of a UE, an ID, a service class/category, and the like.

Having received the report on the status of the carrier C, the serving eNB can report information on the status to a controller of the carrier C via the aforementioned backhaul link. In particular, the controller of the carrier C can perform at least one selected from the group consisting of i) controlling an operation (resource allocation operation) in the carrier C, ii) controlling carrier selection/movement for partial UEs, and iii) controlling various parameters.

For example, when carrier sensing is performed, it may be able to configure a carrier sensing threshold (a reference for determining whether or not a different UE uses a specific carrier). Or, when LBT (listen before transmit or listen before talk) is used, it may be able to configure a backoff window (if a carrier is in an idle state as much as a maximum value of a random value configured by a UE before transmission starts, transmission is permitted). Besides, it may be able to configure transmit power control, a message generation rate, or a channel access probability. If a controller forwards the control message to each of serving eNBs via a backhaul link, each of the serving eNBs can inform UEs of the control message using each of the carrier B (B1, B2, . . . ).

According to the present invention, it may select the carrier C (e.g., C1, C2, . . . ) according to a message category. In particular, it may be able to individually configure the carrier C (e.g., C1, C2, . . . ) depending on a type of a message. A controller selects carrier selection information and can inform a UE of the carrier selection information via a serving eNB. Or, if it is possible that many traffic are concentrated on a specific message according to a message category, it may be able to stochastically assign the many traffic to a plurality of carrier C (e.g., C1, C2, . . . ). For example, traffic is assigned to a carrier C1 with a probability of 60% and traffic is assigned to a carrier C2 with a probability of 40%.

Or, a specific carrier traffic load of the carrier C can be basically too high. Hence, it is necessary to have an operation of distributing a plurality of UEs according to a traffic load status of the carrier C. In this case, a plurality of controllers can determine movement/reconfiguration of a carrier together. Hence, a carrier can be moved using one of two methods (i.e., method 1 and method 2) described in the following.

Method 1) Transmission/reception UEs using X carrier move to use Z carrier with probability of Y. Similarly, a probability of using Z carrier and a probability of using X carrier can be defined by Y and (1−Y), respectively. Moreover, a controller can designate a probability of using each carrier to a specific UE.

Method 2) Transmission/reception UEs corresponding to a partial ID using X carrier (e.g., transmission/reception UEs having specific values after Modular arithmetic is performed on an ID) can be reconfigured to use Z carrier. In particular, a condition for a transmission/reception UE to use Z carrier is defined by (UE ID mod N $\in$ {a,b,c, . . . }) and a condition for a transmission/reception UE to use X carrier is defined by (UE ID mod N $\notin$ {a,b,c, . . . }). In this case, the UE ID can be designated by an ID of a transmission UE. N and values of {a,b,c, . . . } can be designated by a controller. Moreover, a controller can designate a condition for using each carrier.

A controller transmits the control information to each eNB via a backhaul link and each eNB can broadcast the control information using carrier B (e.g., B1, B2, . . . ) of the eNB.

In order to control load amount according to a traffic load of the carrier C, it may consider methods 3 and 4 described in the following.

Method 3) It may indicate a partial transmission/reception UE or the entire transmission/reception UEs using X carrier to decrease or increase transmit power or PSD (power spectral density) and decrease or increase the number of UEs using a current carrier. Or, it may set an upper limit of transmit power or PSD (power spectral density) to make transmission UE not to perform transmission using a value equal to or greater than the upper limit. Or, it may set a lower limit of transmit power or PSD (power spectral density) to make transmission UE not to perform transmission using a value equal to or less than the lower limit.

The method 3 is explained in more detail. When X carrier is mapped to a region according to transmit power information or PSD information, if coverage of the region is changed, transmission/reception UEs can recognize the change. For example, If a UE positioned on X carrier receives information indicating that transmit power or PSD of the X carrier is decreased, the UE recognizes that the coverage of the X carrier decreases and the coverage of a part using Z carrier increases. The UE can change a carrier to which the UE belongs according to the coverage.

Or, the method 3 may indicate an upper limit (or a lower limit) of transmit power or PSD. For example, if an indication value for transmit power or PSD corresponds to P, a controller can configure transmission to be performed using transmit power or PSD equal to or less than the P (equal to or greater than the P when a lower limit is indicated). In this case, a transmission UE performs transmission using transmit power or PSD equal to or less than the P (equal to or greater than the P when a lower limit is indicated).

If there is a carrier mapped to the region, it may be able to recognize a change of coverage via transmit power information or PSD information. Or, a carrier can be mapped according to power (e.g., RSRP) of an RSU or an eNB using the carrier. In this case, it may be able to control coverage of each carrier by making the RSU or the eNB control power or PSD via a controller. To this end, the controller may set an upper limit (or a lower limit) of the power or the PSD to the RSU or the eNB to make the RSU or the eNB not to perform transmission using a value equal to or greater than the upper limit (in case of a lower limit, a value equal to or less than the lower limit).

Method 4) It may indicate a partial transmission UE or the entire transmission UEs using X carrier to decrease or increase a modulation order to decrease or increase a loading amount in a current carrier. Or, it may set an upper limit of a modulation order to make a transmission UE not to perform transmission using a value equal to or greater than the upper limit. Or, it may set a lower limit of a modulation order to make a transmission UE not to perform transmission using a value equal to or less than the lower limit.

Moreover, a probability of modifying a modulation order with a specific modulation order i and a probability of using a modulation order as it is can be defined by $Y_i$ and $$\left(1 - \sum_i Y_i\right),$$

respectively. In this case, a set of the modulation order i can be restrictively generated. For example, in case of D2D mainly using current QPSK, a probability of moving to two restrictive modulation orders and a probability of moving to BPSK and 16QAM are respectively indicated by ¼ and a probability of using QPSK as it is can be automatically calculated by ½. Or, when a modulation order is increased, it may have a probability for a restrictive modulation order. When a modulation order is decreased, it may perform management with a probability for a restrictive modulation order. In this case, a controller may notify whether a modulation order is increased or decreased. Each probability can be indicated by a set defined from restrictive sets. A probability can be defined in advance. (Or, a probability to be used in every modulation order can be defined by $Y_i$ and the sum of the entire probabilities can be defined by $$\sum_i Y_i = 1 \Big).$$

Or, a controller can indicate an upper limit of a modulation order to make a transmission UE perform transmission using a value equal to or less than the upper limit. Or, the controller can indicate a lower limit of a modulation order to make a transmission UE perform transmission using a value equal to or greater than the lower limit.

Or, a condition for a transmission UE to modify a modulation order with a specific modulation order is defined by (UE ID mod N ∈ {a,b,c, . . . }) and a condition for a transmission UE not to modify a modulation order is defined by (UE ID mod N ∉ {a,b,c, . . . }). In this case, the UE ID can be designated by an ID of a transmission UE. N and values of {a,b,c, . . . } can be designated by a controller. Moreover, a controller can designate a condition for using each modulation order. Or, a controller can indicate an upper limit of a modulation order to make a transmission UE perform transmission using a value equal to or less than the upper limit. Or, the controller can indicate a lower limit of a modulation order to make a transmission UE perform transmission using a value equal to or greater than the lower limit.

Method 5) It may indicate a partial transmission UE or the entire transmission UEs using X carrier to decrease or increase a repetition number to decrease or increase a loading amount in a current carrier. Or, it may set an upper limit of a repetition number to make transmission UEs not to perform repetition using a value equal to or greater than the upper limit. Or, it may set a lower limit of a repetition number to make transmission UEs not to perform repetition using a value equal to or less than the lower limit.

For example, a probability of modifying a repetition number with a specific repetition number and a probability of using a repetition number as it is can be defined by Y and 1−Y, respectively. A value of the Y can be designated by a controller. Moreover, the controller can designate a probability of using each repetition number.

Or, a condition for a transmission UE to modify a repetition number with a specific repetition number is defined by (UE ID mod N ∈ {a,b,c, . . . }) and a condition for a transmission UE not to modify a repetition number is defined by (UE ID mod N ∉ {a,b,c, . . . }). In this case, the UE ID can be designated by an ID of a transmission UE. N and values of {a,b,c, . . . } can be designated by a controller. In a broad sense, a controller can designate a condition of using each repetition count.

Method 6) It may indicate a partial transmission UE or the entire transmission UEs using X carrier to set a limit on an RB size. In this case, N number of resource blocks can be transmitted only. The number N can be designated by a controller or can be defined in advance. Or, it may be able to configure RBs greater than the N number of RBs to be transmitted only.

The restriction on an RB size can be given to a specific priority class only. For example, a priority class can be designated according to each of packet types. It may set a resource block size limit of a specific value on a specific priority class only. Moreover, a controller may set a resource block size limit on each priority class.

Moreover, since the message of the controller is valid in a specific region only, the controller can include information on a region to which a control message is applied. An eNB can forward a control message to a UE in a target region only. And, the carrier movement/reconfiguration message is differently applied according to a category or a priority of a V2V message to make a message of a different category/priority operate in a different carrier.

According to an operation of the present invention, UEs operating on the carrier C (e.g., C1, C2, . . . ) may be different from each other on the eNB carrier B (e.g., B1, B2, . . . ) connected with a controller. For example, a subscribed operator or a currently accessed PLMN may be different. For a case of forwarding a control message by the controller, a feedback message may carry PLMN information used as a path of the feedback message (i.e., PLMN information used as a path of the control message).

Hence, the aforementioned operation of moving/reconfiguring the carrier can be differently configured according to a communication service provider. For example, if a communication service provider a uses 50%, a communication service provider b uses 30%, and a communication service provider c uses 20% in a carrier C, it may be able to indicate the communication service provider a to move/reconfigure more UEs to a different carrier. Or, a UE of each of the communication service providers may indicate to move/reconfigure to a different carrier.

In the present invention, a method for a controller to inform UEs of a control message via an eNB is disclosed. Yet, if control information does not exist, it is necessary for a UE to perform a default operation. If the UE fails to receive control information, the UE may autonomously select a resource for transmitting a signal (e.g., randomly or via carrier sensing using a default configuration parameter).

Or, if the UE fails to receive control information, the UE may use a predetermined backoff window. Moreover, although a UE receives control information, if the UE deviates from a positon at which the control information is received more than a prescribed distance, the control message can be invalidated. Or, although a UE receives control information, if predefined valid time of the control information is expired, the control information can be invalidated. If the UE receives new control information before the valid time of the control information is expired, it may be able to configure the old control information to be invalidated.

Or, it may additionally have a reserved carrier. Usually, the reserved carrier is not used. When a transmission UE broadcasts information on a serious accident according to a message category, the transmission UE may use the reserved carrier. Or, it may be able to configure UEs to use the reserved carrier with a certain probability according to a specific message category. Or, it may be able to configure UEs to use the reserved carrier with a certain probability by reflecting all of the aforementioned contents and it may be able to use contents on an important message by moving the contents to the reserved carrier according to a message category. By doing so, it may be able to generate an uncrowded carrier (a carrier capable of being used at any time) for an important message. In this case, it may be able to configure reception UEs to monitor the reserved carrier all the time.

In particular, the reserved carrier can be configured to operate when load of a carrier, which is determined to be used by a default configuration, is determined as high. For example, when an emergency message is configured to be transmitted via carrier C in the default configuration, if a UE determines that load of the carrier C1 is equal to or greater than a prescribed level, the emergency message can be transmitted via carrier C2 corresponding to a reserved carrier. Whether to use a reserved carrier can be autonomously determined by a UE based on a message type of traffic load, and the like. Or, an eNB or a controller can determine whether to use a reserved carrier based on feedback of a UE and informs the UE of a result of the determination. In this case, if all UEs move/reconfigure to a reserved carrier, load of the reserved carrier can be excessively increased. Hence, the use of the reserved carrier can be stochastically determined. For example, it may use a function for the load of the reserved carrier in the default configuration. In particular, as the load increases, a probability of using the reserved carrier can be increased.

An operation of the present invention is explained with reference to FIG. 10 in the following.

Figure 10:
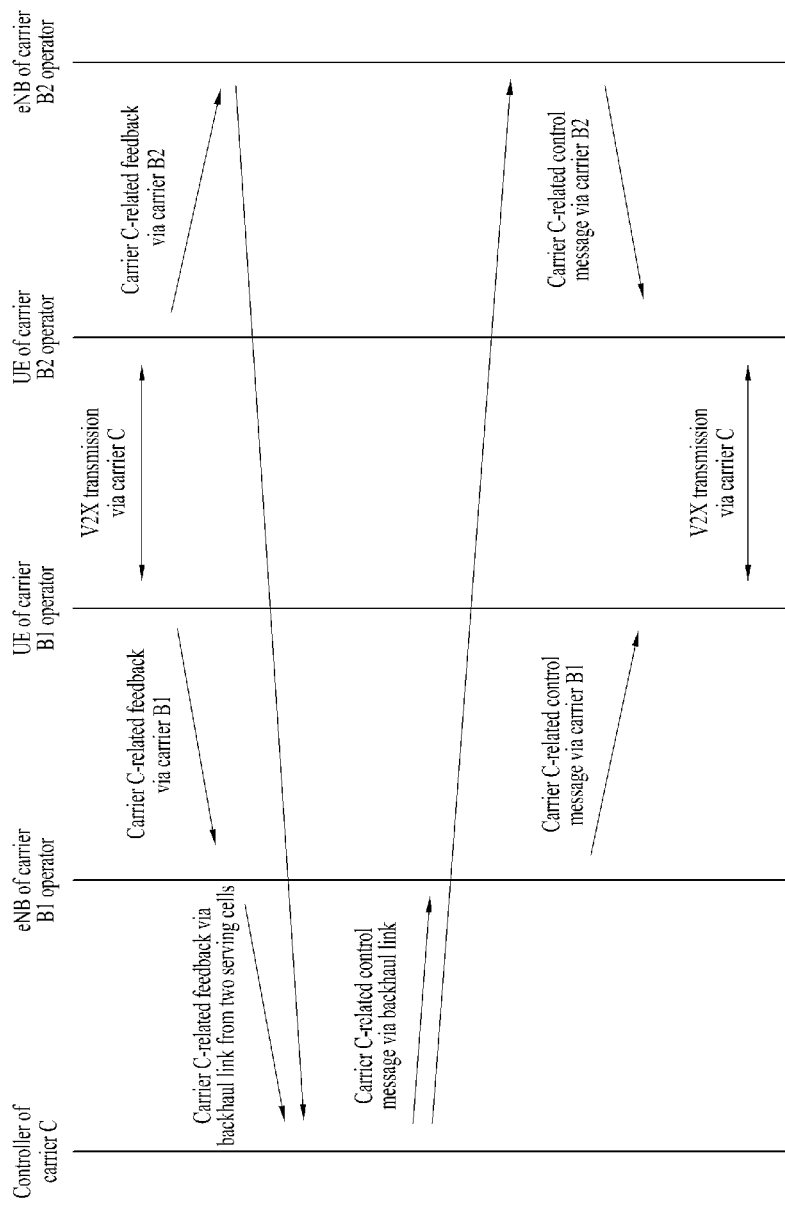
FIG. 10 is a diagram for explaining V2X communication according to an embodiment of the present invention.

In FIG. 10, assume that there exist a controller of a carrier C (i.e., C1, C2, . . . ), an eNB for an operator B1 using a carrier B1, an eNB for an operator B2 using a carrier B2, a UE using the operator B1, and a UE using the operator B2.

First of all, a UE feeds back information on the carrier C to an eNB of the UE via the carriers B1 and B2. The two eNBs feedback the information on the carrier C to the controller of the carrier C via a backhaul link Subsequently, the controller transmits a control message for the carrier C to the two eNBs for the operators B1 and the B2 using a backhaul link. Each of the eNBs sends the control message for the carrier C received from the controller to a UE of the eNB. Hence, the UEs can perform V2X communication via the carrier C.

In the following, when an area and a carrier are mapped, embodiments of the present invention are explained in detail.

One of important roles of V2P is to notify an event occurred on a vehicle or a road to a nearby pedestrian. In the present invention, an event may correspond to timing at which a collision occurs between a vehicle and a pedestrian, information on a broken-down vehicle or a damaged vehicle, or a warning situation that informs a pedestrian of a possibility of an accident. An example of the warning situation is to inform a pedestrian crossing a road of information on an approaching vehicle.

Regarding the event, i) a vehicle at which the event occurs, ii) an eNB broadcasting information on the event, and iii) RSUs (road side units) can broadcast contents of the event. The event can be broadcasted in a form of a message for an actual event, signaling for the actual event, or a notification message (or, a notification signal) notifying that a message is actually transmitted.

In the following, for clarity, the broadcasting of the event is defined as event transmission. Although the present invention is explained centering on a carrier, it can also be interpreted as a specific time/frequency resource. Moreover, an eNB may correspond to an eNB or an RSU.

According to the present invention, when an event is transmitted, it is necessary for a UE to randomly search for a resource position to listen to the event. If a plurality of carriers are used at the same time and a specific event is transmitted via a specific carrier among a plurality of the carriers, reception UEs need to search for resources of all carriers to listen to the specific event. This may lead to the increase of power consumption of the reception UE and the increase of complexity. And, if event transmission is performed on all carriers, a reception UE may search for a single carrier only. However, it may lead to the resource waste on the entire carriers.

Hence, the present invention proposes a method of performing event transmission by mapping a specific area to a carrier. For example, assume that there are 3 carriers and an area is divided into 3 areas. In this case, since each of the areas is mapped to each carrier, it may be able to configure a transmission UE to perform event transmission on a carrier mapped to an area at which the transmission UE is located. In particular, a reception UE recognizes an area at which the reception UE is located and searches for event transmission on a carrier mapped to the area at which the reception UE is located. In particular, if the reception UE knows an area at which the reception UE is located, the reception UE can perform event transmission on a carrier mapped to an area including the area at which the reception UE is located only. In this case, if event transmission is performed by mapping specific areas to each carrier, since a different carrier is mapped to each area, it may be able to additionally obtain an effect of reducing in-band emission.

When event transmission is performed by mapping specific areas to each carrier, basically, the areas can be distinguished from each other based on longitude/latitude. In order for a reception UE to know an area to which the reception UE belongs, the reception UE can obtain location information of the reception UE using a GPS. The location information of the reception UE can be represented in a form of an RSRP range using CRS/CSI-RS/PRS using an eNB or an arrival time range.

Meanwhile, many transmissions can be performed on a single specific carrier. In this case, it may be preferable to move a UE to a different carrier on which relatively less number of transmissions is performed. For example, in order to recognize many transmissions performed on a carrier C, UEs can feedback information on the transmissions performed on the carrier C to a serving cell of the UEs via a carrier B. Moreover, an eNB may feedback information on the traffic amount of the carrier C to a controller of the carrier C using the carrier B.

Having determined the traffic amount, the controller of the carrier C determines the number of UEs to be moved and a carrier to which the UEs is going to be moved. In this case, a plurality of controllers can determine carrier movement/reconfiguration together. Subsequently, the controller can broadcast information on the carrier movement/reconfiguration to UEs using the carrier B via a serving eNB. In this case, two examples described in the following can be applied to the broadcasted information.

Transmission/reception UEs using X carrier are moved/reconfigured to use Z carrier with probability of Y. For example, a probability of using Z carrier and a probability of using X carrier can be defined by Y and (1−Y), respectively. Or, a controller may designate a probability of using each carrier.

Transmission/reception UEs corresponding to a partial ID using X carrier (e.g., transmission/reception UEs having specific values after Modular arithmetic is performed on an ID) are moved/reconfigured to use Z carrier. For example, a condition for a transmission/reception UE to use Z carrier is defined by (UE ID mod N ∈ {a,b,c, . . . }) and a condition for a transmission/reception UE to use X carrier is defined by (UE ID mod N ∉ {a,b,c, . . . }). In this case, the UE ID corresponds to an ID of a transmission UE. N and values of {a,b,c, . . . } can be designated by a controller. Or, a controller may designate a condition for using each carrier.

Moreover, in the present invention, it may consider methods 7 to 10 described in the following to control the load amount according to the traffic load of a carrier C.

Method 7) It may indicate a partial transmission/reception UE or the entire transmission/reception UEs using X carrier to decrease or increase transmit power or PSD (power spectral density) and decrease or increase the number of UEs using a current carrier. Or, it may set an upper limit of transmit power or PSD to make transmission UEs not to perform transmission using a value equal to or greater than the upper limit. Or, it may set a lower limit of transmit power or PSD to make transmission UEs not to perform transmission using a value equal to or less than the lower limit.

Specifically, when X carrier is mapped to a region according to transmit power information or PSD information, if coverage of the region is changed, transmission/reception UEs can recognize the change. For example, If a UE positioned on X carrier receives information indicating that transmit power or PSD of the X carrier is decreased, the UE recognizes that the coverage of the X carrier decreases and the coverage of a part using Z carrier increases. The UE can change a carrier to which the UE belongs according to the coverage. Or, it may use a value indicating an upper limit or a lower limit of transmit power or PSD. For example, a controller can configure transmission to be performed using transmit power or PSD equal to or less than the P (equal to or greater than the P when a lower limit is indicated). In this case, a transmission UE performs transmission using transmit power or PSD equal to or less than the P (equal to or greater than the P when a lower limit is indicated).

If there is a carrier mapped to the region, a UE may recognize a change of coverage via transmit power information or PSD information. Or, a carrier can be mapped according to power (e.g., RSRP) of an RSU or an eNB using the carrier. In this case, it may be able to control coverage of each carrier by making the RSU or the eNB control power or PSD via a controller. To this end, the controller may set an upper limit (or a lower limit) of the power or the PSD to the RSU or the eNB to make the RSU or the eNB not to perform transmission using a value equal to or greater than the upper limit (in case of a lower limit, a value equal to or less than the lower limit).

Method 8) It may indicate a partial transmission UE or the entire transmission UEs using X carrier to decrease or increase a modulation order to decrease or increase a loading amount in a current carrier. Or, it may set an upper limit of a modulation order to make a transmission UE not to perform transmission using a value equal to or greater than the upper limit. Or, it may set a lower limit of a modulation order to make a transmission UE not to perform transmission using a value equal to or less than the lower limit.

For example, a probability of modifying a modulation order with a specific modulation order i and a probability of using a modulation order as it is can be defined by $Y_i$ and $$\left(1 - \sum_i Y_i\right),$$

respectively. In this case, a set of the modulation order i can be restrictively generated. For example, in case of D2D mainly using current QPSK, a probability of moving to two restrictive modulation orders and a probability of moving to BPSK and 16QAM are respectively indicated by ¼ and a probability of using QPSK as it is can be automatically calculated by ½. Or, when a modulation order is increased, it may have a probability for a restrictive modulation order. When a modulation order is decreased, it may perform management with a probability for a restrictive modulation order. In this case, a controller may notify whether a modulation order is increased or decreased. Each probability can be indicated by a set defined from restrictive sets. A probability can be defined in advance. (Or, a probability to be used in every modulation order can be defined by $Y_i$ and the sum of the entire probabilities can be defined by $$\sum_i Y_i = 1\right).$$

Or, a controller can indicate an upper limit of a modulation order to make a transmission UE perform transmission using a value equal to or less than the upper limit. Or, the controller can indicate a lower limit of a modulation order to make a transmission UE perform transmission using a value equal to or greater than the lower limit.

As a different example, a condition for a transmission UE to modify a modulation order with a specific modulation order is defined by (UE ID mod N ∈ {a,b,c, . . . }) and a condition for a transmission UE not to modify a modulation order is defined by (UE ID mod N ∉ {a,b,c, . . . }). In this case, the UE ID corresponds to an ID of a transmission UE. N and values of {a,b,c, . . . } can be designated by a controller. Moreover, a controller can designate a condition for using each modulation order. Or, a controller can indicate an upper limit of a modulation order to make a transmission UE perform transmission using a value equal to or less than the upper limit. Or, the controller can indicate a lower limit of a modulation order to make a transmission UE perform transmission using a value equal to or greater than the lower limit.

Method 9) It may indicate a partial transmission UE or the entire transmission UEs using X carrier to decrease or increase a repetition number to decrease or increase a loading amount in a current carrier. Or, it may set an upper limit of a repetition number to make transmission UEs not to perform repetition using a value equal to or greater than the upper limit. Or, it may set a lower limit of a repetition number to make transmission UEs not to perform repetition using a value equal to or less than the lower limit.

For example, a probability of modifying a repetition number with a specific repetition number and a probability of using a repetition number as it is can be defined by Y and 1−Y, respectively. A value of the Y can be designated by a controller. Or, the controller may designate a probability of using each repetition number.

As a different example, a condition for a transmission UE to modify a repetition number with a specific repetition number is defined by (UE ID mod N ∈ {a,b,c, ... }) and a condition for a transmission UE not to modify a repetition number is defined by (UE ID mod N ∉ {a,b,c, ... }). In this case, the UE ID corresponds to an ID of the transmission UE. N and values of {a,b,c, ... } can be designated by a controller. Or, a controller can designate a condition of using each repetition count.

Method 10) It may indicate a partial transmission UE or the entire transmission UEs using X carrier to set a limit on an RB size. In this case, N number of resource blocks can be transmitted only. The number N can be designated by a controller or can be defined in advance. Or, it may be able to configure RBs greater than the N number of RBs to be transmitted only.

The restriction on an RB size can be given to a specific priority class only. For example, a priority class can be designated according to each of packet types. It may set a resource block size limit of a specific value on a specific priority class only. Moreover, a controller may set a resource block size limit on each priority class.

In case of following the aforementioned methods 7 to 10, UEs can be moved/reconfigured irrespective of an area. If the UEs are moved to Z carrier, the UEs may assume both the previously used X carrier and the Z carrier as reception carriers. By doing so, it may be able to configure a reception UE to search for all event transmissions occurred in an area to which the reception UE belongs using two carriers. Although reception UEs positioned at X carrier are not moved/reconfigured, the reception UEs may assume both the X carrier and the Z carrier as reception carriers.

Hence, according to the present invention, although the Z carrier is moved or reconfigured irrespective of an area, since a frequency band is different from frequency bands of other carriers, an impact of interference is less and it may be able to obtain an effect of reducing interference by controlling traffic amount.

A part of carriers can be configured as reserved carriers without being used for the Z carrier to be moved or reconfigured. The reserved carriers are used for UEs moved or reconfigured from a carrier of heavy traffic.

In the present invention, a situation that a plurality of carriers are crowdedly used in each area may occur. In order to solve the problem, it may broadcast a reset signal. In particular, it may broadcast the reset signal to make UEs return to originally designated carriers from moved/reconfigured carriers. This information can be applied to a UE having a partial ID only or can be transmitted to UEs corresponding to a partial ID only.

According to the present invention, the aforementioned operation of moving/reconfiguring a carrier can be differently configured according to a communication service provider. For example, if a communication service provider a uses 50%, a communication service provider b uses 30%, and a communication service provider c uses 20% in a carrier C, it may be able to indicate the communication service provider a to move/reconfigure more UEs to a different carrier. Or, a UE of each of the communication service providers may indicate to move/reconfigure to a different carrier.

In the present invention, when an event transmission is transmitted by mapping a carrier to an area, each of divided areas may have an overlapped part. This is because, if an area is used without an overlapped part, although it is necessary for reception UEs to listen to event transmission at a boundary part of an area, reception UEs are unable to listen to the event transmission.

When an event transmission is transmitted according to an area, reception UEs assume not only a carrier mapped to an area to which the reception UEs belong but also a prescribed carrier mapped to a nearby area to monitor all of the carriers.

Moreover, when an area is divided in a manner of being overlapped, whether or not a transmission UE performs event transmission is not clear at an overlapped area. In this case, if an event occurs at the overlapped area, it may be able to configure the transmission UE to perform event transmission on all carriers mapped to the overlapped area. Or, it may be able to configure a resource mapped to a duplicately designed area to be recognized by a reception UE only. And, it may be able to configure a transmission vehicle to separately use a not duplicately designed area and carrier mapping.

Figure 11:
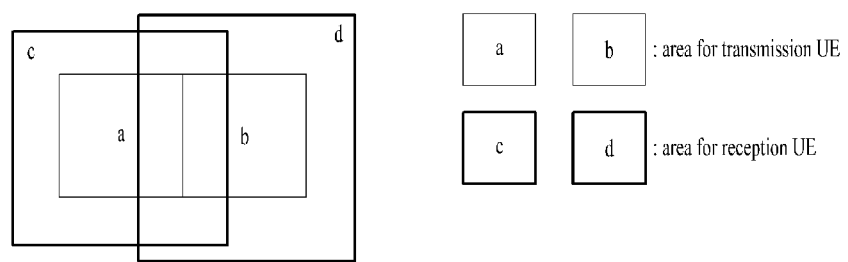
FIG. 11 is a diagram for explaining a region according to a property of a UE in accordance with an embodiment of the present invention.

For example, as shown in FIG. 11, an area a and an area b are designed not to be overlapped and an area of a size equal to a size of the sum of the a and the b can be designed as an area c and an area d which are partly overlapped with each other. In this case, the area c includes the whole of the area a and a part of the area b. The area d includes the whole of the area b and a part of the area a. In this case, the area a and the area c are mapped to the same carrier for event transmission. The area b and the area d are mapped to the same carrier for event transmission.

In FIG. 11, if an event occurs at the area b and a transmission vehicle transmits event transmission in a resource mapped to the area b, a reception vehicle or a pedestrian assumes that the same carrier occurs in the area c wider than the area b.

Or, parts related to either a boundary part of an area or an overlapped part of an area can be separately assigned to a new carrier. In this case, there is a carrier mapped to an area overlapped with an area to which the new carrier is mapped. In this case, reception UEs may assume all carriers mapped to the overlapped area as carriers capable of being received by the reception UEs and monitor the carriers to receive the carriers.

Figure 12:
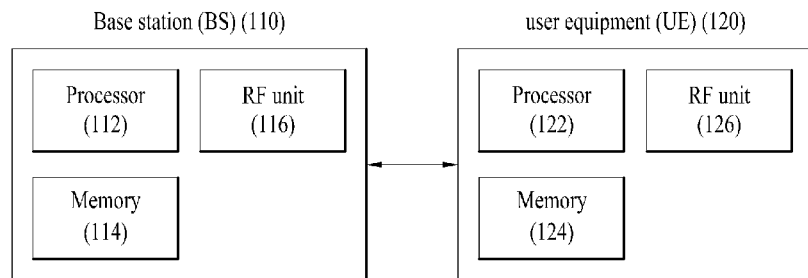
FIG. 12 is a diagram for a base station and a UE applicable to one embodiment of the present invention.

FIG. 12 is a diagram for a base station and a UE applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 12, a wireless communication system includes a base station (BS) 110 and a user equipment (UE)

120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method of transmitting a signal for performing V2X communication in a wireless communication system and an apparatus therefor can be applied to various wireless communication systems.

What is claimed is:

1. A method of transmitting a sidelink signal, which is transmitted by a user equipment to perform vehicle to everything (V2X) communication in a wireless communication system, the method comprising:
    obtaining load information based on a sensing of other sidelink signals in a first resource region configured for the V2X communication;
    reporting the load information to a base station;
    receiving configuration information for transmission parameters related to the load information from the base station; and
    transmitting the sidelink signal in the first resource region based on the configuration information.

2. The method of claim 1, wherein the transmission parameters include a Modulation Coding Scheme (MCS) and a transmission power.

3. The method of claim 1, wherein the transmission parameters include a retransmission number.

4. The method of claim 1, wherein the transmission parameters are determined based on a priority of data included in the sidelink signal and the load information.

5. The method of claim 1, wherein the transmission parameters relate to a size of a resource block.

6. The method of claim 1, wherein an upper limit value of the transmission parameters is configured based on the load information.

7. The method of claim 1, wherein a lower limit value of the transmission parameters is configured based on the load information.

8. The method of claim 1, wherein the load information is related to the ratio of other UEs occupying the first resource region.

9. A user equipment (UE) transmitting a signal to perform vehicle to everything (V2X) communication in a wireless communication system, the UE comprising:
    transceiver; and
    a processor operatively coupled to the transceiver,
    wherein the processor is configured to:
    obtain load information based on a sensing of other sidelink signals in a first resource region configured for the V2X communication,
    controls the transceiver to report the load information to a base station,
    controls the transceiver to receive configuration information for transmission parameters related to the load information from the base station, and
    controls the transceiver to transmit the sidelink signal in the first resource region based on the configuration information.

10. The UE of claim 9, wherein the load information is related to the ratio of other UEs occupying the first resource region.

* * * * *